United States Patent [19]

Meunier

[11] Patent Number: 4,542,185
[45] Date of Patent: Sep. 17, 1985

[54] GRAFT COPOLYMERS OF ALKYL METHACRYLATES—ALKYL ACRYLATES ONTO DIENE—ALKYL ACRYLATE COPOLYMERS AND THEIR USE AS IMPACT MODIFIERS

[75] Inventor: Gilles Meunier, Lescar, France

[73] Assignee: M&T Chemicals Inc., Woodbridge, N.J.

[21] Appl. No.: 623,756

[22] Filed: Jun. 22, 1984

[30] Foreign Application Priority Data

Aug. 31, 1983 [FR] France ................. 83 13997

[51] Int. Cl.$^4$ ........................... C08L 51/00
[52] U.S. Cl. ........................... 525/70; 525/64; 525/66; 525/67; 525/69; 525/75; 525/77; 525/78; 525/80; 525/81; 525/82
[58] Field of Search .......... 525/80, 82, 86, 310, 525/309, 308, 64, 66, 67, 69, 70, 75, 77

[56] References Cited

U.S. PATENT DOCUMENTS

| | | | |
|---|---|---|---|
| 3,041,309 | 6/1962 | Baer | 260/45.5 |
| 3,264,373 | 8/1966 | Whitworth et al. | 260/876 |
| 3,264,375 | 8/1966 | Jones | 525/70 |
| 3,655,825 | 4/1972 | Souder et al. | 260/876 R |
| 3,678,133 | 7/1972 | Ryan | 260/876 R |
| 3,749,755 | 7/1973 | Bronstert et al. | 260/876 R |
| 3,787,522 | 1/1974 | Dickie et al. | 260/836 |
| 3,842,144 | 11/1974 | Tanaka et al. | 260/876 R |
| 3,886,235 | 5/1975 | Tanaka et al. | 260/880 R |
| 3,922,321 | 11/1975 | Yusa et al. | 260/876 R |
| 3,959,408 | 5/1976 | Yusa et al. | 260/876 R |
| 3,985,703 | 10/1976 | Ferry et al. | 260/42.29 |
| 4,014,842 | 3/1977 | Kosugi et al. | 260/29.6 RB |
| 4,078,018 | 3/1978 | Chauvel et al. | 525/83 |
| 4,173,596 | 11/1979 | DeWitt et al. | 428/402 |
| 4,173,598 | 11/1979 | Castelazo et al. | 525/80 |
| 4,229,549 | 10/1980 | Usami et al. | 525/76 |
| 4,362,845 | 12/1982 | Kamata et al. | 525/310 |
| 4,376,843 | 3/1983 | Linder et al. | 525/83 |
| 4,443,585 | 4/1984 | Goldman | 525/310 |

OTHER PUBLICATIONS

6001 Chemical Abstracts, vol. 94, Jun. 1981, No. 11, Columbus, Ohio, U.S.A. 94:176054a.

*Primary Examiner*—Theodore E. Pertilla
*Attorney, Agent, or Firm*—S. H. Parker; J. Matalon; R. E. Bright

[57] ABSTRACT

The impact resistance of resin compositions consisting of a thermoplastic polymer, particularly a homopolymer or copolymer of vinyl chloride can be improved by an impact additive of the graft copolymer type. The graft copolymer impact additive consists of a backbone composed of a statistical copolymer of butadiene or isoprene, an alkyl acrylate of a $C_2$ to $C_{12}$ alkyl, and optionally a polyfunctional cross-linking agent, onto which are grafted the chains of a statistical copolymer of an alkyl methacrylate of a $C_1$ to $C_4$ alkyl, particularly methyl methacrylate, and an alkyl acrylate of a $C_1$ to $C_8$ alkyl, particularly ethyl acrylate. The backbone of the graft copolymer impact additive comprises 0.5–35% by weight butadiene or isoprene, and up to 10 mole % of the cross-linking agent, while the graft chains of the graft copolymer comprise 5 to 50 mole % of the alkyl acrylate of a $C_1$ to $C_8$ alkyl, and the weight ratio between the grafted chains and the backbone can range from 10 to 200%.

The resin compositions are particularly useful to improve impact strength at low temperatures.

39 Claims, No Drawings

GRAFT COPOLYMERS OF ALKYL METHACRYLATES—ALKYL ACRYLATES ONTO DIENE—ALKYL ACRYLATE COPOLYMERS AND THEIR USE AS IMPACT MODIFIERS

This invention concerns resin compositions with an improved impact strength, said compositions comprising a thermoplastic polymer, particularly homopolymers or copolymers of vinyl chloride, an impact additive of the graft copolymer type, and possibly other additives.

BACKGROUND OF THE INVENTION

Certain synthetic resins, particularly homopolymers and copolymers of vinyl chloride, which are very widely used because of their low cost and good physical and chemical properties, have a low impact strength at ambient temperatures, at low temperatures, or after aging. The proposal has been made to remedy these faults by incorporating into these resins certain products, called impact additives, which are polymers with a certain elastomeric character. Of particular interest among these additives are polyacrylates, modified or unmodified, and also statistical or graft copolymers based on butadiene. In particular, U.S. Pat. No. 3,264,373 describes an impact additive for polymer-based resins containing a least 80% by weight of polymerized vinyl chloride; it consists of a copolymer of methyl methacrylate grafted onto a backbone formed of a polymer consisting, by weight, of 1 to 20% butadiene and 99 to 80% of an alkyl acrylate of $C_2$ to $C_{12}$ alkyl, said graft copolymer having a grafted methyl methacrylate content of between 10 and 185% preferably 20-50% by weight of the backbone copolymer. Incorporated in the vinyl chloride polymer resin, in a proportion of 0.5-50 parts by weight for each hundred parts of resin, such an additive produces a substantial increase in the impact strength of the resin, with practically no reduction in its heat distortion temperature.

It has now been found that if, in such an additive, the grafted chains of polymethacrylate are replaced by grafted chains of a statistical copolymer of an alkyl methacrylate and an alkyl acrylate in a specific molar ratio, one obtains an impact additive with improved effectiveness. It has also been found that this effectiveness can be further improved by replacing the backbone copolymer with a similar copolymer that has been cross-linked by means of a small quantity of polyfunctional cross-linking agent.

The impact additive used as described in this invention thus produces synthetic resin compositions which have improved impact strength properties at ambient temperature, at low temperatures, or after aging, as compared to those of comparable synthetic resin compositions incorporating the impact additive described in the above-mentioned U.S. patent.

DESCRIPTION OF THE INVENTION

The subject of this invention is therefore synthetic resin compositions with improved impact strength, which comprise: a thermoplastic polymer; an impact additive of the graft copolymer type used in quantities varying between 0.5 and 50 parts by weight for each 100 parts of the thermoplastic polymer, and comprising a backbone composed of a statistical copolymer of a conjugated diene selected from butadiene and isoprene and an alkyl acrylate of a $C_2$ to $C_{12}$ alkyl having a polymerized conjugated diene content ranging between 0.5 and 35% by weight, onto which are grafted, in quantities varying between 10 and 200% by weight of the backbone, chains of a polymer incorporating a polymerized alkyl methacrylate; and possibly other additives. These are characterized by the fact that the grafted chains of the graft copolymer impact additive comprise a statistical copolymer of an alkyl methacrylate of a $C_1$ to $C_4$ alkyl and an alkyl acrylate of a $C_1$ to $C_8$ alkyl, wherein the molar proportion of the $C_1$–$C_8$ alkyl acrylate ranges from 5–50%.

In one aspect the invention relates to a synthetic resin composition having improved impact strength; in an embodiment of this aspect, the invention relates to a thermoplastic resin composition having improved low temperature impact strength which comprises a homopolymer or copolymer of vinyl chloride and an impact additive. In another aspect the invention relates to a method for improving the impact resistance of a thermoplastic resin which comprises incorporating therein a graft copolymer impact additive. In yet another aspect, the invention relates to a graft copolymer, as described.

According to one preferred means of practicing the invention, the backbone of the graft copolymer impact additive comprises a copolymer of the conjugated diene, the $C_2$–$C_{12}$ alkyl acrylate, and a polyfunctional cross-linking agent copolymerizable with said diene and alkyl acrylate, which cross-linking agent has in its molecule at least two unsaturated $CH_2=C<$ groups, said copolymer comprising 0.5-35% by weight of the polymerized diene and having a molar concentration of the polymerized cross-linking agent ranging from 0.02 to 10%, preferably 0.05 to 7%.

Said polyfunctional cross-linking agent can, in particular, be selected from derivatives with two or more vinyl or allyl double bonds, such as divinylbenzenes, triallyl cyanurate, diallyl phthalate, diallyl itaconate, triallyl isocyanurate, trimethylolpropane triacrylate or trimethacrylate, allyl acrylate or methacrylate, alkylene glycol diacrylate or dimethacrylate with 2-10 carbon atoms in the alkylene chain, and particularly ethylene glycol diacrylate or dimethacrylate, 1,4-butanediol diacrylate or dimethacrylate, 1,6-hexanediol diacrylate or dimethacrylate, or polyoxyalkylene glycol diacrylate or dimethacrylate with the formula

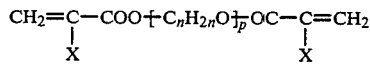

in which X is hydrogen or methyl, n is a whole number ranging from 2 to 4, and p is a whole number ranging between 2 and 20, and particularly polyoxyethylene glycol diacrylate or dimethacrylate, in which the polyoxyethylene radical has a molecular weight of about 400 (i.e., the case in the above-mentioned formula where n=2 and p=9).

As indicated above, the alkyl acrylate, which is polymerized with butadiene or isoprene and optionally with the polyfunctional cross-linking agent to make up the backbone of the graft polymer impact additive, is an alkyl acrylate of a $C_2$ to $C_{12}$ alkyl, said alkyl radical being preferably free of branching on the carbon bonded to the acryloxy group. Examples of acrylates that are appropriate for the formation of the backbone copolymer include ethyl acrylate, n-propyl acrylate, n-butyl acrylate, amyl acrylate, 2-methylbutyl acrylate, 3-methylbutyl acrylate, n-hexyl acrylate, n-octyl acrylate, n-decyl acrylate, or 2-ethylhexyl acrylate.

The preferred concentration of polymerized butadiene or isoprene in the copolymer which, cross-linked or not, forms the backbone of the graft copolymer impact additive, is 1–25% by weight of the backbone copolymer.

In the impact additive according to the invention, the chains grafted onto the backbone comprise a statistical copolymer of an alkyl methacrylate of a $C_1$ to $C_4$ alkyl and an alkyl acrylate of a $C_1$ to $C_8$ alkyl. Alkyl methacrylates that can be used include ethyl methacrylate, n-propyl methacrylate, isopropyl methacrylate, n-butyl methacrylate, isobutyl methacrylate, and especially methyl methacrylate. Examples of the alkyl acrylate of a $C_1$ to $C_8$ alkyl are methyl acrylate, ethyl acrylate, n-propyl acrylate, n-butyl acrylate, n-hexyl acrylate, 2-methylbutyl acrylate, 3-methylbutyl acrylate, n-octyl acrylate, and 2-ethylhexyl acrylate; it is preferred to use those alkyl acrylates mentioned in which the alkyl residue is from $C_1$ to $C_4$.

In the statistical copolymer of the alkyl methacrylate of a $C_1$ to $C_4$ alkyl and the alkyl acrylate of a $C_1$ to $C_8$ alkyl, which makes up the grafted chains of the graft copolymer impact additive, the molar proportion of the alkyl acrylate of a $C_1$ to $C_8$ alkyl preferably represents 10–30%.

It is advantageous if the grafted chains represent from 10% to 60% by weight of the backbone of the graft copolymer.

In order to estimate the molecular weight of the impact additive, a viscosity in the molten state can be defined, which varies with the molecular weight. This viscosity in the molten state can have a fairly large range of values, provided that its value is sufficient to prevent migration of the impact additive during the processing of the resin composition incorporating said additive. As a representative value for this viscosity in the molten state, it is convenient to take the value of the resisting torque of a Brabender rheometer containing 50 g of the impact additive and operating at a temperature of 200° C. with a rotor rotation rate of 40 rpm; measurement of the torque is done after 20 minutes at 200° C. Appropriate values for the viscosity in the molten state of the impact additive correspond to values for the above-mentioned torque which are between 6 and 40 Nm. In the case of resin compositions in which the thermoplastic polymer is a polymer comprising at least 80% by weight of polymerized vinyl chloride, the preferred values for viscosity in the molten state of the impact additive correspond to values for the above-mentioned torque ranging between 8 and 30 Nm, especially between 10 and 25 Nm.

The impact additive can be prepared by any method which allows the production of a graft copolymer with a backbone and grafted chains as defined above. However, it is preferable to prepare the backbone of the graft copolymer, and also to perform the grafting process, using techniques of emulsion polymerization.

The following polymerization procedure can be used. In the first stage, an emulsion is formed comprising, for each part by weight of the monomer to be polymerized, 1 to 10 parts of water, 0.001 to 0.03 part of an emulsifying agent, and the monomers to be polymerized to make up the backbone of the graft polymer impact additive, namely butadiene or isoprene, the alkyl acrylate of a $C_2$ to $C_{12}$ alkyl, and if desired a polyfunctional cross-linking agent, in proportions corresponding to those desired in the backbone copolymer. One then adds 0.001 to 0.05 part of a free radical-generating catalyst, and keeps the reaction medium thus formed at a temperature between, for example, room temperature and 90° C., with stirring, for a long enough period to obtain practically complete conversion of the monomers. In the second state, a mixture of an alkyl methacrylate of a $C_1$ to $C_4$ alkyl and an alkyl acrylate of a $C_1$ to $C_8$ alkyl is grafted onto the backbone copolymer obtained during the first stage. This is done by adding an appropriate quantity of the mixture of alkyl methacrylate and alkyl acrylate to the reaction medium which resulted from the first stage, to obtain a graft copolymer which has the desired proportion of graft chains and the desired molar quantity of alkyl acrylate in these chains, as well as, if desired, the additional quantities of emulsifying agent and a radical-type catalyst, also within the limits defined above. The mixture thus formed is maintained at a temperature in the above-mentioned range, with stirring, until one obtains practically complete conversion of the grafting monomers.

As the emulsifying agent, any one of the known surfactants may be used, whether anionic, nonionic, or cationic. In particular, the emulsifying agent may be chosen from among the anionic surfactants such as the sodium of potassium salts of fatty acids, particularly sodium laurate, sodium stearate, sodium palmitate, sodium oleate, mixed sulfates of sodium or potassium and fatty alcohols, particularly sodium lauryl sulfate, sodium or potassium salts of sulfosuccinic esters, sodium or potassium salts of the alkyl aryl sulfonic acids, particularly sodium dodecylbenzene sulfonate, sodium didodecylnaphthalene sulfonate, and sodium or potassium salts of fatty monoglyceride monosulfonates, or also from among the nonionic surfactants such as the reaction products of ethylene oxide and an alkyl phenol or aliphatic alcohols, alkyl phenols, or aliphatic alcohols. Mixtures of these surfactants can also be used if necessary.

Catalysts that might be used in both the first and the second stage of emulsion polymerization as mentioned above are compounds which produce free radicals under the temperature conditions chosen for polymerization. These compounds may be, in particular, peroxide compounds such as hydrogen peroxide, persulfates of the alkali metals, particularly sodium or potassium persulfate, ammonium persulfate, percarbonates, peracetates, perborates, peroxides such as benzoyl peroxide or lauroyl peroxide, and hydroperoxides such as cumene hydroperoxide, paramenthane hydroperoxide or tert-butyl hydroperoxide. However, it is preferable to use catalytic systems of the redox type, formed by the combination of a peroxide compound, for example one of those mentioned above, or a persulfate with a reducing agent, particularly a sulfite of an alkali metal, a bisulfite of an alkali metal, a sulfoxylate of an alkali metal, ascorbic acid, or glucose, and in particular those of the above-mentioned catalytic systems which are water-soluble, for example potassium persulfate/sodium metabisulfite or also tert-butyl hydroperoxide/sodium metabisulfite.

One can also add to the polymerization mixture of either or both of the stages, chain-limiting compounds, particularly mercaptans such as tert-dodecyl mercaptan, isobutyl mercaptan and n-dodecyl mercaptan, with the aim of regulating the molecular weight of the backbone and/or of the grafted chains of the graft copolymer; one can also add compounds such as phosphates in order to control the ionic strength of the polymerization medium.

The reaction medium obtained at the end of the second stage of emulsion polymerization, which consists of an aqueous emulsion of the graft copolymer produced, is then treated in order to separate the graft copolymer from it. This can be done by, for example, subjecting the emulsion to a coagulation treatment by contact with a salt solution that has been acidified with concentrated sulfuric acid, then separating by filtration the solid product resulting from coagulation; said solid product is then washed and dried to yield a powder of the graft copolymer. The graft copolymer contained in the emulsion can also be recovered by means of a spray-drying technique.

The resulting graft copolymer is a powder whose grain size can range between a few microns (for example 1-5 microns) and 200-300 microns; said grain size depends on the technique used to separate the graft copolymer from the emulsion polymerization medium.

Resin compositions according to the invention can be prepared by any method allowing the production of a homogeneous mixture comprising a thermoplastic polymer, the impact additive, and possibly other additives. For example, the ingredients composing the resin composition can be mixed together in the dry state, and the resulting mixture can then be extruded. When the thermoplastic polymer is produced by emulsion polymerization, it may be convenient to mix the emulsion of the graft copolymer with the emulsion of the thermoplastic polymer, and to process the resulting emulsion to separate out from it the solid product it contains; the techniques can be described above with reference to separation of the graft copolymer.

The thermoplastic copolymer, which forms one of the constituent elements of the resin compositions according to this invention, may consist of one or more polymers of the polycondensate type, particularly polyesters such as polybutylene terephthalate, polycarbonates or polyamides, or also of the addition polymer type, such as, for example, polymethacrylate and particularly polymethyl methacrylate. Preferably, the thermoplastic polymer consists of one or more addition polymers chosen from the group formed by the homopolymers of vinyl chloride which may possibly be perchlorinated, and the copolymers which result from the copolymerization of vinyl chloride with one or more ethylene-unsaturated comonomers and which contain at least 80% by weight of polymerized vinyl chloride. Examples of comonomers for the preparation of such copolymers are particularly the vinylidene halides such as vinylidene chloride or fluoride, the vinyl carboxylates such as vinyl acetate, vinyl propionate and vinyl butyrate, acrylic and methacrylic acids as well as the nitriles, amides and alkyl esters which are derived from them, particularly acrylonitrile, acrylamide, methacrylamide, methyl methacrylate, methyl acrylate, butyl acrylate, ethyl acrylate, and 2-ethylhexyl acrylate, the vinyl aromatic derivatives such as styrene or vinylnaphthalene, and the olefins such as bicyclo[2.2.1]hept-2-ene, bicyclo]2.2.1]-hepta-2,5-diene, ethylene, propene and 1-butene.

Additives in addition to the impact additive which can be present in the resin compositions according to the invention include those such as pigments, coloring agents, plasticizers, antioxidants, heat stabilizers, additives facilitating processing, and lubricants.

The preferred concentration of impact additive in the resin compositions described above represents 1-30% by weight of the thermoplastic polymer. Concentrations of impact additive between 2 and 10% by weight of the thermoplastic polymer are especially appropriate when said polymer is selected from the group formed by the polymers of vinyl chloride and the copolymers of vinyl chloride with a comonomer such as those defined above. The resin compositions obtained in this latter case are appropriate for the manufacture of exterior facing products, such as vinyl siding.

The invention is illustrated by the following examples, which are not limiting.

EXAMPLE 1

(a) Synthesis of a Graft Copolymer Impact Additive According to the Invention

This process was carried out in a reactor equipped with a stirring device and provided with a double jacket containing a heating fluid to maintain the temperature of the reactor.

(1) Preparation of the Backbone Copolymer, No Cross-Linking

After nitrogen degassing, 1,180 g of dimineralized water and 3.43 g of disodium phosphate were placed in the reactor, which was kept at ambient temperature with stirring; in this medium was dissolved 28.7 g of sodium lauryl sulfate as emulsifying agent. The temperature of the reactor contents was then brought to 57° C. and, while this temperature was maintained, 628 g of butyl acrylate and 64.8 g of butadiene were added simultaneously to the contents. While the temperature of the reactor was kept at 57° C., 0.85 g of tert-dodecyl mercaptan diluted in 8 ml of water was then added to the reaction mixture as a chain limiter, together with 0.58 g of sodium metabisulfite in 19 ml of water and 0.91 g of potassium persulfate in 32 ml of water as the catalytic system. The contents of the reactor were then maintained at 57° C. for 3 hours, and then at 80° C. for one hour, after which the reactor was cooled to 57° C. The yield, with 99% conversion, was a butadiene/butyl acrylate copolymer in the form of a latex and containing, by weight, 9.3% of polymerized butadiene.

(2) Grafting of the Methacrylate/Acrylate Mixture onto the Backbone Copolymer 233.1 g of methyl methacrylate and 58.3 g of ethyl acrylate were added, with stirring, to the contents of the reactor, cooled to 57° C. at the conclusion of the preparation of the backbone copolymer, followed by 0.65 g of tert-dodecyl mercaptan.

In the reaction medium thus formed were then dissolved 0.13 g of sodium metabisulfite in 13.5 ml of water and 0.32 g of potassium persulfate in 13.5 g of water. The contents of the reactor were maintained at 57° C. for 1.5 hours, and its temperature was then raised to 80° C. and 0.52 g of tert-butyl hydroperoxide and 0.13 g of sodium metabisulfite in 13.5 ml of water were then added to the contents. The reaction mixture was then kept at 80° C. for one hour. At the end of this period, the contents of the reactor were cooled to room temperature and the latex of the graft copolymer produced, whose average particle diameter was 0.15 μm, was coagulated in a salt solution with concentrated sulfuric acid. The coagulate product was then filtered, washed and dried to yield a powder constituting the graft copolymer impact additive.

Conversion of the mixture of methyl methacrylate and ethyl acrylate during grafting was about 98.5%. The graft copolymer contained a proportion of grafted chains of methyl methacrylate/ethyl acrylate representing 42% of the weight of the backbone and had a viscosity in the molten state corresponding to a value equal to 13.6 Nm of torque on the Brabender rheometer operating under the conditions set out in the description above. The molar proportion of polymerized ethyl acrylate in the grafted chains was equivalent to 20%.

(b) Synthesis of a Graft Copolymer Impact Additive as Control

Under conditions similar those described in section (a) of this example, a control graft copolymer was synthesized, composed of chains of polymethyl methacrylate grafted onto a backbone copolymer of butadiene and butyl acrylate.

This was done by using, the grafting phase described above, 291 g of methyl methacrylate instead of the mixture of methyl methacrylate and ethyl acrylate, while the other operating conditions remained the same.

With a methyl methacrylate conversion of 99%, this yielded a graft copolymer containing a proportion of grafted polymethyl methacrylate representing 42% of the backbone copolymer, said backbone copolymer incorporating 9.2% by weight of polymerized butadiene. Said graft copolymer possessed a viscosity in the molten state corresponding to a value of 15.6 Nm of torque on the Brabender rheometer.

(c) Preparation and Characteristics of the Resin Compositions

The following describes the preparation of a PVC-based resin composition suitable for production of exterior siding products, and gives the impact strength characteristics of test pieces made from this resin composition.

Into a Papenmeir-type mixer were placed 5 parts by weight of the impact additive prepared as described in section (a) (additive 1.a) or in section (b) (control additive 1.b) of this Example, 100 parts by weight of PVC with a K value of 67, 0.3 parts by weight of a processing aid consisting of an acrylic polymer (Paraloid K 175, marketed by Rohm & Haas), 2 parts of calcium stearate, 1 part of a polyethylene wax with a melting point of 74° C., 1.5 parts of a heat stabilizer based on tin thioglycolate, and 12 parts of $TiO_2$.

Using the composition in this fashion, test pieces were prepared for the following tests to determine the impact strength characteristics.

Impact tensile test (ASTM standard D 1822-68):

A measurement is taken of the energy required to break a standard test piece by means of an impact producing tensile stress in the test piece.

Izod impact bending test (ASTM standard D 256-73):

A measurement is taken on the energy absorbed by the breakage of a notched test piece, clamped at one end, and subjected to an impact producing bending of the test piece.

Low temperature impact strength test:

In this test, a method is used which is derived from that defined in ASTM Standard D 3029-72; a measurement is taken of the energy absorbed in breaking a plate-shaped test piece, placed horizontally and kept at low temperature, and subjected to an impact by a 5.1 kg weight ending in a cylinder with a diameter of 12.7 mm and with one rounded end, said weight falling freely from a height of 70 centimeters.

In order to prepare the test pieces for the impact-tensile and the Izod impact tests, the resin composition derived from the mixture of the above-mentioned ingredients was calendered at 165° C. for 7 minutes on a Schwabenthan-type caldendering machine, then molded at 190° C. on a Derragon press for 5 minutes under a pressure of 200 bars, into the form of plates; said plates were cooled while under pressure. The test pieces were prepared with a punch in the case of the impact-tensile tests, and with a circular saw and a notcher for the Izod impact tests. The thickness of the test pieces, whose shape was that prescribed by the above-mentioned standards, was 1 mm for the impact-tensile test, and 3 mm for the Izod impact test.

To prepare the test pieces for the low-temperature impact strength test, the resin composition defined above was kneaded in a double-screw extruder of the Krauss-Maffei KMD 25 type, then molded in a press operating at 190° C. under 200 bars, into the form of plates with a length and width of 60 mm and a thickness of about 1 mm.

One batch of the test pieces used for the impact-tensile test had previously been subjected to 850 hours of aging under the radiation emitted by a xenon lamp in an accelerated-aging system of Climatron type. In order to take into account the influence of aging, the term "percentage of loss" was used to define a magnitude corresponding to the relative change in energy at breakage, with the form $(E - E_v)/(E) \times 100$, where $E$ and $E_v$ represent, respectively, the energies at breakage before and after aging for 850 hours in the Climatron.

A comparison of the results shown in Table 1 indicates that replacement of the grafted chains of polymethyl methacrylate in the graft copolymer impact additive with grafted chains of a copolymer of methyl methacrylate and ethyl acrylate comprising 20 mole % of ethyl acrylate leads, under otherwise identical conditions, to an improvement in the impact strength of the resin composition incorporating the impact additive, and that this improvement is particularly noticeable at low temperature.

TABLE I

| Impact Additive | Impact Tensile Test at 21° C. | | | Notched Izod Impact at 21° C. | Low Temperature Impact Test | | |
|---|---|---|---|---|---|---|---|
| | $E(\alpha)$ (kJ/m$^2$) | $E_v(\alpha)$ (kJ/m$^2$) | % of Loss | Energy at breakage (J/cm of notch) | Test Temperature | Energy at Break (J/mm) ($\beta$) | Force at Break (daN/mm) ($\gamma$) |
| 1.a (Invention) | 746 | 522 | 30 | 14.1 | −10° C. | 14.6 | 212 |
| | | | | | −20° C. | 9.9 | 188 |
| 1.b | 710 | 482 | 32 | 13 | −10° C. | 10 | 189 |

TABLE I-continued

| Impact Additive | Impact Tensile Test at 21° C. | | | Notched Izod Impact at 21° C. | Low Temperature Impact Test | | |
|---|---|---|---|---|---|---|---|
| | E(α) (kJ/m²) | Ev(α) (kJ/m²) | % of Loss | Energy at breakage (J/cm of notch) | Test Temperature | Energy at Break (J/mm) (β) | Force at Break (daN/mm) (γ) |
| (Control) | | | | | −20° C. | 7 | 178 |

(α) - kJ/m² = kilojoules per m² of test piece
(β) - J/mm = joules per mm of thickness of the test piece plate
(γ) - da N/mm = daN per mm of thickness of the test piece plate

EXAMPLE 2

(a) Synthesis of the Cross-Linked Graft Copolymer Impact Additives According to the Invention Using a reactor equipped with a stirrer and provided with a double jacket containing a heating fluid to maintain the reactor temperature, three synthesis tests were done with cross-linked graft copolymers according to the invention, in which the cross-linking agent was, respectively, allyl methacrylate (test A), ethylene glycol dimethacrylate (test B) and polyethylene glycol dimethacrylate with a polyoxyethylene chain with a molecular weight of about 400 (test C).

(1) Preparation of the Cross-Linked Backbone 1,180 g of demineralized water and 3.43 g of disodium phosphate, after nitrogen degassing, were introduced into the reactor at room temperature while stirring; in this mixture was dissolved 28.7 g of sodium lauryl sulfate as emulsifying agent. The temperature of the reactor contents was then raised to 57° C., and while this temperature was being maintained, 628 g (4.85 moles) of butyl acrylate, 64.8 g (1.20 moles) of butadiene, and a quantity of the cross-linking agent corresponding to 0.062 mole were then added simultaneously. While the temperature of the reactor was still kept at 57° C., 0.85 g of tert-dodecyl mercaptan in 8 ml of water was added as a chain limiter, together with 0.58 g of sodium metabisulfite in 19 of water and 0.91 g of potassium persulfate in 32 ml water as a catalytic system. The contents of the reactor were then kept at 57° C. for 3 hours and then at 80° C. one hour, after which the reactor was cooled to 55° C.

The yield, with 99% conversion of the monomers, was a butadiene/butyl acrylate/cross-linking agent terpolymer occurring as a latex and comprising, by weight, a quantity of polymerized butadiene equivalent to 9.2% for test A, 9.2% for test B, and 8.9% for test C. The molar concentration of polymerized cross-linking agent in said copolymers was 1%.

(2) Grafting of the Methacrylate/Acrylate Mixture onto the Backbone Copolymer

The operating conditions for the grafting process were the same as those described in part (a.2) of Example 1

Conversion of the methyl methacrylate and ethyl acrylate mixture was about 99% in each of the tests.

The graft copolymers obtained in the three tests incorporated a proportion of grafted chains of the statistical methyl methacrylate/ethyl acrylate copolymer representing 41.6% for test A, 41.3% for B, and 40.1% for test C, relative to the weight of the backbone copolymer, and had a viscosity in the molten state corresponding to a Brabender torque rheometer reading, obtained as defined above of 13.2 Nm for test A, 14.6 Nm for B, and 12.6 Nm for test C. The molar proportion of polymerized ethyl acrylate in the grafted chains of each of the graft copolymers represented 20%.

(b) Preparation and Characteristics of the Resin Compositions

Four PVC-based resin compositions were prepared as described in section (c) of Example 1, using as impact additive a graft copolymer chosen from among the graft copolymers synthesized in tests A, B and C mentioned above, and the control graft polymer synthesized as described in part (b) of Example 1.

Test pieces were formed from these compositions, and the impact strength characteristics of the test pieces were determined as indicated in Example 1.

The results obtained are summarized in Table 2.

These results show that if, in addition to replacing the grafted chains of polymethyl methacrylate in the graft copolymer impact additive with grafted chains of a copolymer of methyl methacrylate and ethyl acrylate as described, one uses a cross-linked copolymer of butadiene and butyl acrylate to form the backbone of said graft copolymer, there is an improvement not only in the low-temperature impact strength of the resin composition, but also in its impact strength after aging.

TABLE II

| Impact Additive | Impact-Tensile Test at 21° C. | | | Notched Izod Impact at 21° C. | Low Temperature Impact Test | | |
|---|---|---|---|---|---|---|---|
| | E (kJ/m²) | Ev (kJ/m²) | % of Loss | Energy at breakage (J/cm of notch) | Test Temperature | Energy at Break (J/mm) | Force at Break (daN/mm) |
| Test A | 730 | 562 | 23 | 13.8 | −10° C. | 15.9 | 205 |
| | | | | | −20° C. | 8.6 | 187 |
| Test B | 735 | 581 | 21 | 13.9 | −10° C. | 15.3 | 203 |
| | | | | | −20° C. | 8.3 | 185 |
| Test C | 740 | 577 | 22 | 14.1 | −10° C. | 16.3 | 204 |
| | | | | | −20° C. | 9.3 | 193 |
| Ex. 1.b Control | 710 | 482 | 32 | 13 | −10° C. | 10 | 189 |
| | | | | | −20° C. | 7 | 178 |

EXAMPLE 3

Preparation and Characteristics of Resin Compositions Incorporating the Impact Additive of Example 1 in Variable Compositions Proceeding as described in section (c) of Example 1, a series of PVC-based resin compositions were prepared, incorporating the impact additive prepared in that example. The quantities of impact additive and of $TiO_2$ varied from one composition to another, while the quantities of the other ingredients remained the same as defined in Example 1.

Using the compositions thus obtained, test pieces were prepared, and their impact strength characteristics were measured as indicated in Example 1.

The results obtained are summarized in Table 3.

These results again show, at the various concentrations of impact additive and of $TiO_2$, and improved impact strength for those PVC compositions in corporating the impact additive according to the invention (additive 1a), as compared to corresponding compositions incorporating the control impact additive (additive 1b).

TABLE III

| Impact Additive Source | Quantity (+) | Quantity TIO$_2$ (+) | Notched Impact Izod at 21° C. J/cm of Notch | Impact-Tensile at 21° C. E (kJ/m$^2$) |
|---|---|---|---|---|
| Ex. 1a | 2 | 2 | 1.3 | 666 |
| Ex. 1b (Control) | 2 | 2 | 1.1 | 571 |
| Ex. 1a | 3 | 2 | 1.6 | 723 |
| Ex. 1b | 3 | 2 | 1.4 | 686 |
| Ex. 1a | 4 | 2 | 12.9 | 745 |
| Ex. 1b | 4 | 2 | 12.1 | 707 |
| Ex. 1a | 5 | 2 | 13.7 | 771 |
| Ex. 1b | 5 | 2 | 13.1 | 739 |
| Ex. 1a | 2 | 12 | 7.5 | — |
| Ex. 1b | 2 | 12 | 4 | — |
| Ex. 1a | 3 | 12 | 13.2 | — |
| Ex. 1b | 3 | 12 | 12.2 | — |
| Ex. 1a | 4 | 12 | 13.5 | — |
| Ex. 1b | 4 | 12 | 12.9 | — |
| Ex. 1a | 5 | 12 | 14.1 | 746 |
| Ex. 1b | 5 | 12 | 13 | 710 |

(+): Parts by weight per 100 parts by weight of PVC

EXAMPLE 4

(a) Synthesis of Cross-Linked Graft Copolymer Impact Additives According to the Invention Using a reactor equipped with a stirrer and a double jacket containing a heating fluid to maintain the reactor temperature, a series of cross-linked graft copolymers according to the invention was prepared, by grafting a mixture of methyl methacrylate and ethyl acrylate onto a backbone copolymer consisting of a copolymer of butadiene/butyl acrylate/cross-linking agent; said cross-linking agent was polyoxyethylene glycol dimethacrylate, with a polyoxyethylene chain having molecular weight of about 400 (formula defined previously, with $X=CH_3$, $n=2$ and $p=9$) used in the synthesis corresponding to test C in Example 2.

The preparation of the backbone copolymer and the implementation of grafting were carried out under the operating conditions defined in part (a) of Example 2, but variable quantities of the cross-linking agent were used during preparation of the backbone copolymer, and 0.325 g of tert-decyl mercaptan was used for the grafting.

Conversion of the monomers curing each of the stages of preparation of the graft copolymers was about 98%.

(b) Preparation and Characteristics of the Resin Compositions

PVC-based resin compositions were prepared as described in section (c) of Example 1, using as the impact additive a copolymer selected from among graft copolymers synthesized as described in part (a) of the present example and the control graft copolymer synthesized as indicated in part (b) of Example 1.

These compositions were to form test pieces for the impact-tensile test, and a measurement was taken of the breakage energy E under impact-tensile stress, as indicated in Example 1.

The quantities of cross-linking agent used, the compositions of the graft copolymers produced, and the results of the impact-tensile tests are given in Table 4.

As the results of the impact-tensile test show, the PVC resin compositions incorporating the impact additive according to the invention have improved impact strength as compared to corresponding resin composition incorporating the same concentration of control impact additive; this improvement in impact strength increases with the amount of polymerized cross-linking agent in the backbone of the graft copolymer impact additive.

TABLE IV

| | Graft Copolymer | | | | | |
|---|---|---|---|---|---|---|
| | Backbone | | Grafts | | | |
| Quantity of Cross-Linking Agent (g) | Polymerized Butadiene Weight % | Polymerized Cross-Linking Agent Mole % | Weight Ratio Between Grafts and BackBone | Ethyl Acrylate Content Mole % | Torque On Brabender Rheometer (Nm) | Impact-Tensile at 21° C. E(kJ/m$^2$) |
| 4.9 | 9.28 | 0.15 | 41.8 | 20 | 15.4 | 738 |
| 9.8 | 9.22 | 0.29 | 41.5 | 20 | 13.2 | 748 |
| 16.3 | 9.13 | 0.48 | 41.1 | 20 | 12.6 | 767 |
| 24.5 | 9 | 0.73 | 40.6 | 20 | 11.8 | 811 |
| 0 (Control) | 9.3 | 0 | 42 | 0 | 15.6 | 710 |

EXAMPLE 5

(a) Synthesis of Cross-Linked Graft Copolymer Impact Additives According to the Invention Using a reactor equipped with a stirrer and a double jacket containing a heating fluid to maintain the reactor temperature, three synthesis tests were done with the graft copolymers according to the invention, by grafting a mixture of methyl methacrylate and ethyl acrylate onto a backbone copolymer consisting of a butadiene/butyl acrylate/cross-linking agent copolymer, said cross-linking agent being selected from among the following compounds:

polyethylene glycol dimethacrylate, with a polyoxyethylene chain having a molecular weight of about 200 (formula defined previously, with $X=CH_3$, $n=2$ and $p=5$): this compound is designated by the abbreviation PEG 200 DMA;

polyethylene glycol dimethacrylate, with a polyoxyethylene chain having a molecular weight of about 400 (in the formula, $X=CH_3$, $n=2$ and $p=9$); this compound is designated by the abbreviation PEG 400 DMA;

polyethylene glycol dimethacrylate, with a polyoxyethylene chain having a molecular weight of about 600 (in the formula, $X=CH_3$, $n=2$ and $p=14$); this compound is designated by the abbreviation PEG 600 DMA.

The cross-linked backbone copolymer was prepared and the grafting performed under the operating conditions defined in part (a) of Example 2, but quantities of cross-linking agent were used which produced 0.15 mole % of polymerized cross-linking agent in the backbone, and 0.325 g of tert-dodecyl mercaptan was used for the grafting.

Monomer conversion during each of the stages of preparation of the grafted copolymers was close to 98%.

(b) Preparation and Characteristics of the Resin Compositions

PVC-based resin compositions were prepared as described in section (c) of Example 1, using as the impact additive a graft copolymer chosen from among the graft copolymers synthesized as described in part (a) of the present example and the control graft copolymer synthesized as indicated in part (b) of Example 1.

Test pieces for the impact-tensile test were formed from these compositions, and we determined the energy at breakage E under impact-tension for these test pieces as indicated in Example 1.

The quantities of cross-linking agent used, the composition of the graft copolymers produced, and the results of the impact-tensile test are summarized in Table 5.

The results of the impact-tensile test demonstrate that PVC resin compositions incorporating impact additives according to the invention show improved impact strength as compared to a corresponding resin composition incorporating the same quantity of control impact additive.

(b) from 0.5 to 50 parts by weight per 100 parts by weight of thermoplastic polymer of a graft copolymer impact additive which comprises
  (i) a backbone consisting essentially of a statistical copolymer of butadiene or isoprene with an alkyl acrylate of $C_2$ to $C_{12}$ alkyl, wherein the butadiene or isoprene represents from about 0.5 to about 35% of the weight of the backbone;
  (ii) a copolymer grafted onto said backbone, said grafted copolymer consisting essentially of a statistical copolymer of $C_1$-$C_4$ alkyl methacrylate with a $C_1$-$C_8$ alkyl acrylate, said alkyl acrylate comprising a molar proportion of from 5 to 50%, said grafted copolymer representing from 10 to 200% of the weight of the backbone.

2. A composition according to claim 1 in which the backbone further comprises a polyfunctional cross-linking agent copolymerizable with the diene and alkyl acrylate, said polyfunctional cross-linking agent having at least two unsaturated $CH_2=C<$ groups and being present in a molar proportion of from about 0.02% to about 10%.

3. A resin composition according to claim 2, in which the cross-linking agent is allyl acrylate or methacrylate, alkylene glycol diacrylate or dimethacrylate with 2 to 10 atoms of carbon in the alkylene chain, trimethylolpropane triacrylate or trimethacrylate, triallyl cyanurate, triallyl isocyanurate, diallyl phthalate, diallyl itaconate or divinylbenzene.

4. A composition according to claim 2, in which the cross-linking agent is a polyoxyalkylene glycol diacrylate or dimethylacrylate with the formula

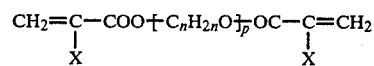

in which X is hydrogen or methyl, n is a whole number ranging from 2 to 4, and p is whole number ranging from 2 to 20.

5. A composition according to claim 2 in which the cross-linking agent is present in a molar proportion of from about 0.2% to about 10%.

6. A composition according to claim 1 in which the polymerized butadiene or isoprene in the backbone comprises from about 1 to about 25% by weight of the backbone.

7. A composition according to claim 1 in which the

TABLE V

| Cross-linking Agent | | Graft Copolymer | | | | | |
|---|---|---|---|---|---|---|---|
| | | Backbone | | Grafts | | | |
| Designation | Quantity (g) | Polymerized Butadiene Weight % | Polymerized Cross-Linking Agent Mole % | Weight Ratio Between Grafts and BackBone | Ethyl Acrylate Content Mole % | Torque On Brabender Rheometer (Nm) | Impact-Tensile at 21° C. $E(kJ/m^2)$ |
| | 0 Control | 9.3 | 0 | 42 | 0 | 15.6 | 710 |
| PEG 200 DMA | 3.2 | 9.3 | 0.15 | 41.9 | 20 | 16.6 | 794 |
| PEG 400 DMA | 4.9 | 9.28 | 0.15 | 41.8 | 20 | 17.4 | 748 |
| PEG 600 DMA | 6.8 | 9.26 | 0.15 | 41.6 | 20 | 19.2 | 775 |

What is claimed is:

1. A synthetic resin composition having improved impact strength which comprises
(a) a thermoplastic polymer alkyl methacrylate of the grafted copolymer is methyl methacrylate.

8. A composition according to claim 1 in which the alkyl acrylate of the grafted copolymer is $C_1$-$C_4$ alkyl.

9. A composition according to claim 1 in which the alkyl acrylate of the grafted copolymer is ethyl acrylate.

10. A composition according to claim 1 in which the alkyl acrylate of the grafted polymer comprises a molar proportion of about 10 to about 30% of the grafted chains.

11. A composition according to claim 1 in which the thermoplastic polymer comprises a homopolymer or copolymer of vinyl chloride.

12. A composition according to claim 1 in which the grafted copolymer is from 10% to 60% of the weight of the backbone.

13. A thermoplastic resin composition having improved low temperature impact strength which comprises
(a) a homopolymer or copolymer of vinyl chloride and
(b) from 1 to 30 parts by weight per 100 parts by weight of vinyl chloride polymer of a graft copolymer impact additive which comprises
   (i) a backbone consisting essentially of a statistical polymer containing 1 to 25% by weight of butadiene or isoprene, up to 10 mole % of polyfunctional cross-linking agent containing at least two $CH_2=C<$ groups in its molecule, and an alkyl acrylate where the alkyl group is $C_1$-$C_4$ alkyl and
   (ii) a copolymer grafted onto said backbone, said grafted copolymer consisting essentially of a statistical copolymer of methyl methacrylate and an alkyl acrylate where the alkyl is $C_1$-$C_4$ alkyl, the molar proportion of alkyl acrylate in said grafted copolymer being from about 10 to about 30%, the grafted copolymer being from about 10% to about 60% of the weight of the backbone.

14. A composition according to claim 13 which contains from about 2 to about 10 parts by weight of graft copolymer impact additive per 100 parts by weight of vinyl chloride polymer.

15. A composition according to claim 13 in which the backbone contains from 0.05 to 7 mole % of polyfunctional cross-linking agent.

16. A composition according to claim 15 in which the polyfunctional cross-linking agent comprises allyl acrylate or methacrylate, alkylene glycol diacrylate or dimethacrylate with 2 to 10 atoms of carbon in the alkylene chain, trimethylolpropane triacrylate or trimethacrylate, triallyl cyanurate, triallyl isocyanurate, diallyl phthalates, diallyl itaconate or divinylbenzene.

17. A composition according to claim 13 in which the cross-linking agent is a polyoxyalkylene glycol diacrylate or dimethylacrylate with the formula $$CH_2=C-COO\mbox{$+$}C_nH_{2n}O\mbox{$\frac{}{p}$}OC-C=CH_2$$
$$\hspace{0.5em}X\hspace{10em}X$$

in which X is hydrogen or methyl, n is a whole number ranging from 2 to 4, and p is a whole number ranging from 2 to 20.

18. A method for improving the impact resistance of a thermoplastic resin which comprises incorporating therein from 0.5 to 50% by weight of a graft copolymer impact additive which comprises
(i) a backbone consisting essentially of a statistical copolymer containing 0.5 to 35% by weight of butadiene or isoprene, an alkyl acrylate where the alkyl group is $C_2$-$C_{12}$ alkyl, and up to 10 mole % of a polyfunctional cross-linking agent copolymerizable with the diene and alkyl acrylate and which contains at least two $CH_2=C<$ groups, and
(ii) a copolymer grafted onto said backbone, said grafted copolymer being 10% to 200% of the weight of the backbone and consisting essentially of a statistical copolymer of a $C_1$-$C_4$ alkyl methacrylate with 5 to 50 mole % of a $C_1$-$C_8$ alkyl acrylate.

19. A method according to claim 18 in which the backbone contains 0.02 to 10 mole % of a cross-linking agent selected from allyl acrylate or methacrylate, alkylene glycol diacrylate or dimethacrylate with 2 to 10 atoms of carbon in the alkylene chain, trimethylolpropane triacrylate or trimethacrylate, triallyl cyanurate, triallyl isocyanurate, diallyl phthalate, diallyl itaconate or divinylbenzene.

20. A method according to claim 18 in which the backbone contains 0.02 to 10 mole % of a cross-linking agent selected from polyoxyalkylene glycol diacrylate or dimethylacrylate with the formula $$CH_2=C-COO\mbox{$+$}C_nH_{2n}O\mbox{$\frac{}{p}$}OC-C=CH_2$$
$$\hspace{0.5em}X\hspace{10em}X$$

in which X is hydrogen or methyl, n is a whole number ranging from 2 to 4, and p is whole number ranging from 2 to 20.

21. A method according to claim 18 in which the backbone contains from 1 to 25% by weight of butadiene or isoprene.

22. A method according to claim 21 in which the backbone consisting essentially of a copolymer of butadiene or isoprene with a $C_1$-$C_4$ alkyl acrylate.

23. A method according to claim 18 in which the grafted copolymer is a copolymer of methyl methacrylate with a $C_1$-$C_4$ alkyl acrylate.

24. A method according to claim 23 in which the grafted copolymer contains 10 to 30 mole % of $C_1$-$C_4$ alkyl acrylate.

25. A composition according to claim 24 in which alkyl acrylate is ethyl acrylate.

26. A method according to claim 18 in which the thermoplastic resin comprises a homopolymer or copolymer of vinyl chloride.

27. A method according to claim 26 in which the graft copolymer impact modifier is incorporated in an amount of from 1 to 30% by weight of the resin.

28. A method according to claim 18 which comprises incorporating from about 2 to about 10% by weight of graft copolymer impact modifier into a vinyl chloride homopolymer or copolymer.

29. A method according to claim 18 in which the graft copolymer impact additive has a molten viscosity of between 6 and 40 Nm for the torque of a Brabender rheometer determined using 50 gms of impact additive maintained in said rheometer for 20 minutes at 200° C. with a rotor rotation rate of 40 rpm.

30. A graft copolymer which comprises:
(i) a backbone consisting essentially of a statistical copolymer containing 0.5 to 35% by weight of butadiene or isoprene, an alkyl acrylate where the alkyl group is $C_2$-$C_{12}$ alkyl, and up to 10 mole % of a polyfunctional cross-linking agent copolymerizable with the diene and alkyl acrylate and which contains at least two $CH_2=C<$ groups, and
(ii) a copolymer grafted onto said backbone, said grafted copolymer being 10% to 200% of the weight of the backbone and consisting essentially of a statistical copolymer of a $C_1$-$C_4$ alkyl methacrylate with 5 to 50 mole % of a $C_1$-$C_8$ alkyl acrylate.

31. A graft copolymer according to claim 30 in which the backbone contains 0.02 to 10 mole % of a cross-linking agent selected from allyl acrylate or methacrylate, alkylene glycol diacrylate or dimethacrylate with 2 to 10 atoms of carbon in the alkylene chain, trimethylolpropane triacrylate or trimethacrylate, triallyl cyanurate, triallyl isocyanurate, diallyl phthalate, diallyl itaconate or divinylbenzene.

32. A graft copolymer according to claim 30 in which the backbone contains 0.02 to 10 mole % of a cross-linking agent selected from polyoxyalkylene glycol diacrylate or dimethylacrylate with the formula

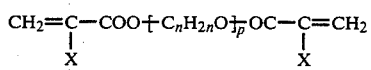

in which X is hydrogen or methyl, n is a whole number ranging from 2 to 4, and p is whole number ranging from 2 to 20.

33. A graft copolymer according to claim 30 in which the backbone contains from 1 to 25% by weight of butadiene or isoprene.

34. A graft copolymer according to claim 33 in which the backbone consisting essentially of a copolymer of butadiene or isoprene with a $C_1$-$C_4$ alkyl acrylate.

35. A graft copolymer according to claim 30 in which the grafted copolymer is a copolymer of methyl methacrylate with a $C_1$-$C_4$ alkyl acrylate.

36. A graft copolymer according to claim 35 in which the grafted copolymer contains 10 to 30 mole % of $C_1$-$C_4$ alkyl acrylate.

37. A graft copolymer according to claim 36 in which alkyl acrylate is ethyl acrylate.

38. A graft copolymer according to claim 30 which has a molten viscosity of between 6 and 40 Nm for the torque of a Brabender rheometer determined using 50 gms of impact additive maintained in said rheometer for 20 minutes at 200° C. with a rotor rotation rate of 40 rpm.

39. A composition according to claim 1 wherein the graft copolymer further comprises a polyfunctional cross-linking agent copolymerizable with the diene and alkyl acrylate.

* * * * *